United States Patent [19]
Wong

[11] Patent Number: 5,610,274
[45] Date of Patent: Mar. 11, 1997

[54] PRODUCTION AND USE OF MAGNETIC POROUS INORGANIC MATERIALS

[75] Inventor: Yuan N. Wong, Boonton, N.J.

[73] Assignee: CPG, Inc., Lincoln Park, N.J.

[21] Appl. No.: 952,264

[22] Filed: Sep. 28, 1992

Related U.S. Application Data

[62] Division of Ser. No. 794,910, Nov. 20, 1991.

[51] Int. Cl.$^6$ ............................................. A61K 38/02
[52] U.S. Cl. ......................... 530/334; 436/526; 436/527; 252/62.54
[58] Field of Search .................. 530/334; 252/62.54; 428/405; 436/526, 527

[56] References Cited

U.S. PATENT DOCUMENTS

| | | | |
|---|---|---|---|
| 4,233,169 | 11/1980 | Beall | 252/62.59 |
| 4,264,648 | 4/1981 | Ziolo | 427/128 |
| 4,297,337 | 10/1981 | Mansfield | 424/1 |
| 4,554,088 | 11/1985 | Whitehead et al. | 436/526 |
| 4,672,040 | 6/1987 | Josephson | 436/525 |
| 4,812,512 | 3/1989 | Buendia et al. | 525/54.11 |

Primary Examiner—David Lukton
Attorney, Agent, or Firm—Edward S. Irons

[57] ABSTRACT

Magnetic porous inorganic siliceous materials having a particle size of about 1 to about 200 microns useful as solid supports in various chromatography, immunoassays, synthesis and other separation and purification procedures as disclosed.

2 Claims, No Drawings

PRODUCTION AND USE OF MAGNETIC POROUS INORGANIC MATERIALS

This is a division of pending application Ser. No. 07/794,910 filed Nov. 20, 1991.

FIELD OF INVENTION

This invention provides-porous inorganic, magnetic materials useful in biochemical synthesis, assay, purification and separation procedures. More particularly the invention relates to magnetic siliceous inorganic materials such as controlled pore glass (CPG), porous silica gel, and porous ceramic products, to methods for the preparation of such products, and to various uses for such products. The invention relates to the surface modification of such products by, e.g., physically adsorbed or chemically immobilized biological molecules, and to practical applications thereof.

BACKGROUND OF THE INVENTION

Porous inorganic siliceous materials including glass, ceramics, and silica gel are used as solid supports in chromatography, immunoassays, synthesis and other separation and purification procedures.

Gravitational and centrifuged separation of such porous materials from the surrounding medium when used in batch procedures such as immunoassays, is inefficient and time consuming. Centrifugal separations also require expensive and energy consuming apparatus.

Separation of magnetic solid supports is relatively easy and simple, especially for multiple, small aliquots of the kind frequently encountered in sample preparation and immunoassay procedures. Agitation of magnetic solid supports is readily accomplished by on and off switching of magnetic fields located at opposite sides of a container or simply shaken by hand. Non-porous metal oxide magnetic particles and magnetic polystyrene beads lack surface area necessary to provide high binding capacity.

Although there are quite a number of magnetic materials commercially available or reported in the literature, such as: iron oxide particles of U.S. Pat. Nos. 4,554,088 and 3,917,538; nickel oxide particles in *Biotec. and Bioengr.* XIX:101–124 (1977); agarose-polyaldehyde bead containing magnetic particles of U.S. Pat. No. 4,732,811. Commercial products such as: "DYNABEADS" (magnetic polystyrene bead); "MAGNOGEL 44" (magnetic polyacrylamide-agarose); "ENZACRY" (poly-m-diaminobenzene of iron oxide) reported in *Clin. Chim. Acta.* 69:387–396 (1976). Other types of magnetical particles reported in the literature include: cellulose containing ferric oxide, *Clin. Chem.* 26:1281–1284 (1980) and albumin magnetic microspheres, Ovadia, et al. *J. Immunol. Methods* 53:109–122 (1982).

SUMMARY OF THE INVENTION

This invention provides a novel and simple method for making porous inorganic magnetic materials including any glass, silica gel or alumina, useful,e.g., in the separation of biochemical moieties or biological molecules or fragments thereof from a surrounding medium, in the synthesis of peptides and oligonucleotides, in the purification of mRNA or poly (dA) directly after synthesis and in DNA assay procedures in various immunoassay procedures for enzyme immobilization and in sample preparation.

The magnetic products of the invention have a pore diameter of from about 60 to about 6,000 Angstroms (A), preferably between about 300 A to about 5,000 A. Specific pore volume, which is proportional to the surface area for a given pore size is from about 0.5 to about 2.5 cc/gm, preferably from about 0.75 to about 1.5 cc/gm. Particle size is from about 1 to about 200 microns, preferably from about 5 to about 50 microns.

This invention provides both ferromagnetic materials and superparamagnetic materials. The latter are preferred to preclude magnetic aggregation and to facilitate redispersion upon removal of a magnetic field.

This invention also includes porous inorganic magnetic materials, preferably siliceous materials, surface modified to provide functional groups such as amino, hydroxyl, carboxyl, epoxy, aidehyde, sulfhydryl, phenyl or long chain alkyl groups to facilitate the chemical and/or physical attachment of biological molecules and other moieties, e.g., enzymes, antibodies, oligopeptides, oligonucleotides, oligosaccharides or cells. Surface modification to create such functionality may be accomplished by coating with organic silanes. See, e.g., Bonded Stationary Phases in Chromatography, ed. by E. Grushka (1974). Alternate methods for providing derivatized or functional group containing surfaces on the magnetic products of this invention include U.S. Pat. Nos. 3,983,299 and 4,554,088.

None of the prior art magnetic porous inorganic particles known to applicant have the same practical range of pore diameter, narrow pore diameter distribution, high pore volume, high surface area, surface modification versatility, solvent system compatibility and simplicity of production as the products of this invention.

DEFINITIONS

The following definitions apply to this application:

The term "magnetic porous inorganic materials" is defined as any porous siliceous inorganic materials such as porous glass, porous silica gel and porous alumina, etc., which comprises magnetic materials either through physical adsorption or chemical binding.

The term "magnetic material" is defined as a transition metal oxide having ferrospinel structure and comprising trivalent and divalent cations of the same or different transitional metals, for example, iron oxide $Fe_3O_4$.

The term "colloidal magnetic particles" is defined as finely divided magnetic materials of submicron size, usually 50–250 Angstrom. Such particles may be present in combination with a carrier liquid and a surfactant material and may remain dispersed throughout a carrier liquid medium.

The term "superparamagnetism" is defined as the magnetic behavior exhibited by the magnetic materials, which respond to a magnetic field without resultant permanent magnetization.

The term "solid phase sandwich type radioimmunoassay (RIA)" refers to an immunoassay in which a solid phase is first immobilized with an antibody (or antigen) and is then used to bind the targeted antigen (or antibody) in a sample. A second antibody (or antigen) labelled with radioactive materials is then added to bind the antigen (or antibody) serving as a signal for the presence of the target antigen (or antibody). The immunocomplex formed on the solid phase would be like Ab-Ag-Ab* (or Ag-Ab-Ag*), hence, a sandwich type immunoassay.

DETAILED DESCRIPTION OF THE INVENTION

The porous inorganic magnetic materials of the invention are produced by adding magnetic metallic particles such as iron oxide, preferably as an aqueous colloidal suspension to an aqueous slurry of CPG, siliceous material such as silica gel, or alumina, agitation of the mixture, removal of excess magnetic particles, and drying the product. Aqueous colloidal iron oxide is preferred.

The CPG, silica gel or alumina used in the process is selected to have a pore diameter, pore volume and particle size to provide a final porous magnetic product of the desired physical characteristics. Combination with, e.g., iron oxide, may reduce original pore volume by about 5% to about 15%.

Controlled pore glass useful in this invention is commercially available in a range of pore dimensions from CPG, Inc., 32 Pier Lane West, Fairfield, N.J. The production of controlled pore glass is described in U.S. Pat. Nos. 3,549,524 and 3,758,284.

Colloidal magnetic particles useful in the invention constitute from about 2% to 15% by volume of magnetic particles in liquid, preferably water, suspension medium. Colloidal iron oxide is commercially available as "Ferrofluid" (trademark) from Ferrofluidics Corp., 40 Siman Street, Nashua, N.H. Ferrofluids containing from about 1% to about 6% of iron oxide in water or organic phase such as perfluorinated polyether or diester are useful in the practice of the invention. The production of ferrofluid is described in U.S. Pat. Nos. 3,531,413 and 3,917,538.

Agitation of the mixture of porous inorganic material and colloidal magnetic particles is appropriately accomplished by shaking or by a non-metallic mixer at room temperature for a time period of from about 3 to 96 hours. Discoloration of, e.g., CPG, indicates adsorption or lodging of the colloidal magnetic particles within the pores of the inorganic material.

Removal of unbound colloidal magnetic particles may be accomplished by washing with water followed by polar liquids. An appropriate washing sequence is water, 1.5M aqueous sodium chloride, acetone and methanol. Each wash step is continued until the supernatant is clear.

The final, washed, magnetic particles are filtered and dried, e.g., overnight at 90° C. or at 120° C. for one hour or vacuum dried for six hours. Depending on the pore diameter, the dry magnetic porous particles appear light to dark brown in color and respond to a magnetic field. In general, materials of relatively small pore diameter which have a higher specific surface area adsorb more colloidal magnetic particles and, hence, exhibit stronger magnetic properties than materials of larger pore diameter.

To provide functional groups for the binding of biological moieties including cells and biomolecules. The magnetic porous particles may then be subjected to surface modification such as silanization. See, e.g., Grusha, supra and U.S. Pat. Nos. 3,383,299 and 4,554,088. It also secures immobilization of the magnetic particle in the inorganic material pores.

A general formula for the silicone compounds useful for silanization is: R—Si—X, where R represents an organic moiety with a terminal functional group such as an amino, hydroxyl, epoxy, aidehyde, sulfhydryl, phenyl, long chain alkyl or other group that will chemically react or physically absorb with the biological molecules and X may be a mono-, di-or trialkoxy or halide group which will react with the silanol groups on the surface of the inorganic material. The degree of silanization can be demonstrated through quantitative analysis of the respective functional groups.

The preferred colloidal magnetic particles for use in this invention are superparamagnetic metal oxide. The size of the colloidal particles may range from 1 to 100 nm, preferably 5 to 50 nm (50 to 500 Angstroms (A)). Other superparamagnetic colloidal solutions are described in U.S. Pat. Nos. 3,215,572 and 4,554,088.

EXAMPLE I

Preparation of Magnetic Porous Inorganic Material With Ferrofluid Colloidal Particles 5 gm of controlled pore glass (CPG, pore diameter of 3000 Angstrom, 37–77 microns) was added to a 70 ml container containing 50 ml of deionized water. To the glass slurry, 1 ml of Ferrofluid colloidal iron oxide (Ferrofluidics Corp.) was added. The Ferrofluid contained 1 to 3% by volume superparamagnetic 100 A iron oxide particles in an aqueous medium. The container was placed in the shaker and gently shaken for 24 hours. The glass particles turned into dark brown color. Excessive Ferrofluid was decanted off after the glass settling down. After five washes with water, one wash with 1.5M NaCl solution, three more water washes and three more methanol washes, the magnetic controlled porous glass (magnetic CPG) was then filtered and dried at 90° C. for eight hours. The final product was attracted by laboratory permanent magnet.

Physical characteristics of the magnetic controlled porous glass (magnetic CPG) product were checked by microscopic examination. Pore morphology was determined by porosimeter and surface area analyzer. Under the microscope, the appearance of the magnetic CPG was the same as the regular porous glass except that the magnetic CPG particle was of a uniform brown color. The porosity data for both before and after coating magnetic particles are listed in Table I. Specific pore volume was decreased as expected, because part of the pore volume was occupied by the colloidal iron oxide particles. The increase in the surface area is due to the existence of colloidal particles.

TABLE I

Porosity Data For Glass Particles Before and After Coating with Magnetic Colloidal Particles

|  | Before Coating | After Coating |
| --- | --- | --- |
| Mean pore dia. (A) | 3000 | 3000 |
| Specific pore vol. (cc/gm) | 0.89 | 0.84 |
| Pore diam. distribution (%) | 8.4 | 6.9 |
| Surface area (M2/gm) | 7.4 | 8.97 |
| Lot No. | 11C24 | 081783-2 |

EXAMPLE II

Preparation of Magnetic Silica Gel With Colloidal Magnetic Particles (Magnetic Silica Gel)

5 grams of Daisogel, a silica gel product of Daiso Co., Inc., 10-5, Edobori 1-Chome Nishi-Ku, Osaka, Japan, having pore diameter of 1000 Angstrom, 5 micron spherical bead was slurried in a 70 ml bottle containing 50 ml of tetrahydrofuran. To the silica gel slurry, 1 ml of ferrofluid colloidal iron oxide was added. The ferrofluid contained 3 to 6% by volume of superparamagnetic 100 A iron oxide particles in organic base medium. The container was placed in the shaker and shaken for 24 hours at room temperature. At the end of mixing time, the excess solution was decanted off. The silica gel was then washed with 3×10 ml of tetrahydrofuran, 3×10 ml of ethyl acetate, 5×10 ml of methanol and finally another 5×10 ml of deionized water. During each washing cycle, a permanent magnet was used to accelerate the settling down of the magnetic silica gel. The magnetic silica gel was then dried at 120° C. for 1 hour. The porosity data for both uncoated and magnetic colloidal particle coated Daisogel are listed in Table II.

TABLE II

Porosity Data for Silica Gel Particles
Before and After Coating with Colloidal Iron Oxide

|  | Before Coating | After Coating |
| --- | --- | --- |
| Mean pore diameter (Angstrom) | 688 | 685 |
| Specific pore volume (cc/gm) | .95 | .85 |
| Pore diam. distribution (%) | 27.3 | 24.7 |
| Surface area (M$^2$/gm) | 67.1 | 60.6 |
| Lot No. | DS-GEL05 | MSIL1005 |

EXAMPLE III

Preparation of Magnetic Porous Inorganic Materials With Colloidal Iron Oxide Particles Colloidal iron oxide was prepared by the method of U.S. Pat. No. 4,554,088 with some modification: A 20 ml of 2:1 molar ratio of $FeCl_2/FeCl_3$, solution was mixed with equal volume of 4.5M sodium hydroxide to form a crystalline precipitate of superparamagnetic ion oxide, having a particle size diameter of 0.1 to 1.5 microns. For the purposes of this invention, such particle size was too large to produce magnetic porous particles. To obtain the appropriate colloidal size of iron oxide particles, the concentration of ferrous/ferric chloride was diluted at least 10 fold, the mixing of iron chloride solution and sodium hydroxide was done in a ultrasonic bath for at least two hours, and the pH of the precipitate solution was adjusted to about 7.5. The particle size was monitored by microscopic observation or by light scattering technique. Aggregation, if any, found among the colloidal particles was washed away in the course of the porous material coating procedure. The final iron oxide particle size was about 200 Angstrom to about 500 Angstrom.

2 gm of controlled pore glass (CPG, pore diameter of 1000 Angstrom, 77–125 microns (CPG, Inc.)) was mixed with 10 ml colloidal iron oxide (50 vol. % precipitate). The slurry was shaken gently in the shaker for 24 hours. Excessive colloidal iron oxide was decanted off, and glass slurry was exhaustively washed with water until the supernate became clear. The glass was then washed with methanol, filtered and dried in the oven at 90° C. for eight hours. The final product was brown in color and attracted by a permanent magnet.

EXAMPLE IV

Preparation of Magnetic Amino Controlled Pore Glass (Magnetic Amino CPG)

The product of Example I was further dried under vacuum at room temperature for two hours. 5 gm of the dried magnetic CPG was placed in a three neck round bottom flask. 150 ml of 10% gamma-aminopropyltrimethoxysilane in dry toluene was added to the flask. The slurry was gently stirred under refluxing condition for 24 hours. The glass was then washed with methanol for five times to remove excessive silane. The settling process could be sped up by placing a circular magnet under the container. The glass was then filtered and baked in the oven at 90° C. for eight hours. The magnetic amino glass (magnetic amino CPG) was quantified by titration and found to have 35.5 micromole amino groups per gram of solid.

EXAMPLE V

Preparation of Magnetic Epoxide Controlled Pore Glass (Magnetic Epoxide CPG)

5 gm of dried magnetic CPG prepared as described by Example I was placed in a three neck round bottom flask. 150 ml of 10% 3-glycidoxypropyltrimethoxysilane in dry toluene was added to the flask. The slurry was gently stirred under refluxing condition for 24 hours. The magnetic CPG was then washed with methanol and acetone to remove excessive silane. The magnetic CPG glass was then filtered and baked in the oven at 100° C. for 16 hours. The epoxide group was quantified by titration and found to have 42 micromoles per gram of solid.

EXAMPLE VI

Coupling of Anti-HBsAg to Magnetic Amino-Controlled Pore Glass (Magnetic Amino-CPG)

One gram of magnetic amino glass (magnetic amino-CPG) prepared from Example IV was added to a bottle containing 30 ml of 10% aqueous glutaraldehyde at pH-7.0. The slurry was shaken gently in the shaker for one half hour at room temperature. 30 mg of sodium borohydride was then added and the slurry was then shaken in an ice-water bath for three hours. At the end of the reaction, the glass was washed with phosphate buffer thoroughly. The settling of the glass particles was accelerated by using a magnetic field. The amino groups on the surface of the glass were thus converted to aldehyde moieties.

9.9 ml (1 mg/ml protein conc.) of crude goat anti-human hepatitis B surface antigen (anti-HBsAg) antibody solution (Electro-Nucleonics Laboratory, Inc.) was added to 1 gm of magnetic aldehyde glass and 12 mg of sodium borohydride. 0.1 M sodium carbonate of pH=9.5 was used to adjust the pH of the mixture to 8.5. The slurry was shaken in the refrigerator for 24 hours. The antibody coupled particles was then washed three times with 0.1M sodium phosphate buffer, pH=7.5 (five times). To block any active sites from residue silanol, amino or aldehyde groups, 5 ml (2 mg/ml) human serum albumin solution was treated with the magnetic antibody coated glass particles for three more hours. The magnetic antibody coated glass (magnetic antibody-CPG) slurry was then washed with phosphate buffered saline (PBS) three time, 1M NaCl once, and back to PBS three more times. The particles were then stored in the refrigerator for use in immunoassay procedures.

EXAMPLE VII

Magnetic Antibody Coated Controlled Pore Glass (Magnetic Antibody-CPG) For Sandwich Type Radioimmunoassay (RIA) For Human Hepatitis B Surface Antigen HBsAg 200 microliter of four negative and three positive serum standards containing deactivated human hepatitis B surface antigen were applied to each Riasure assay tube ("Riasure" is the trademark for radioimmunoassay for human hepatitis B surface antigen, produced by Electro-Nucleonics Laboratory, Inc.) containing one tablet form of CPG powder (which disintegrated back into powder form in the serum sample) or 10 microliter of the magnetic antibody CPG slurry, prepared from Example VI in working buffer (1:1 vol. %). After one hour of incubation at 25° C., both glass slurrys were washed five times with supplied phosphate buffer saline (PBS). The washing cycle for non-magnetic glass particles were 60 seconds stirring and 90 seconds settling; for magnetic particle, the washing cycles had been cut down to 60 seconds stirring and 20 seconds of settling with the help of an external magnetic field on the side. After five washing cycles, 100 microliter of radioactive iodine ($I^{125}$) labelled goat anti-hepatits B surface antibody ($I^{125}$ anti-HBsAg) was then added to each assay tube. After another hour incubation at 25° C., the glass particles were again subjected to five PBS (phosphate buffered saline) washing cycles prior to radiation count. The results obtained from RIA are presented in the following Table III.

TABLE III

Radioimmunoassay For Hepatitis B Surface Antigen With Regular And Magnetic Glass Particles

| Samples | Count Per Minute (CPM) | |
| --- | --- | --- |
| | Regular CPG | Magnetic CPG |
| Negative | 169 | 200 |
| Negative | 142 | 271 |
| Negative | 196 | 347 |
| Negative | 161 | 233 |
| Positive | 25589 | 39026 |
| Positive | 22551 | 33243 |
| Positive | 25909 | 36257 |
| Ratio of P/N | 147.8 | 137.5 |

EXAMPLE VIII

Preparation of Magnetic Nucleoside CPG

Magnetic dT-CPG is prepared to demonstrate the production of magnetic nucleoside CPGs. Deoxythymidine (dT) is used in this example. dA, dC and dG CPG products are produced in like manner.

5 gram of dried magnetic epoxide CPG prepared in Example V was placed in a 100 ml round bottom flask. To the dried glass powder, 5 gram of 1,6-hexanediamine in 50 ml of dried methanol was added. The slurry was stirred gently at room temperature for three hours. At the end of the reaction, the glass was washed with methanol, 0.05 m sodium acetate buffer of pH 5.5, then deionized water, then final methanol wash before it was filtered and dried. The magnetic long chain amino glass (Magnetic Long Chain Amino CPG) was found to have 35 micromole of primary amine per gram of solid. One gram of this magnetic long chain amino glass, 160 mg of DMTr-deoxythymidine succinic acid, 0.160 ml 1,3-diisopropylcarbodiimide, 2.2 mg 4-dimethylaminopyridine, 1 ml pyridine and 4 ml N,N-dimethylformamide were mixed together in a 8 ml amber vial. The vial was placed on an orbitory shaker for shaking 24 hours at room temperature. At the end of the reaction, the glass was capped with 0.1 ml acetic anhydride for three hours followed by quenching the excessive anhydride with 0.2 ml dried methanol in ice-bath for another three hours. The magnetic DMTr-thymidine glass (magnetic DMTr-dT-CPG) was then washed with N,N-dimethylformamide, methanol and dichloromethane before subjected to vacuum drying. The glass was quantified by cleaving the DMTr (dimethoxytritryl-) moiety from the glass with 3% p-toluenesulfonic acid in acetonitile and measure its absorbance at 504 nm. The DMTr groups were found to be 23 micromoles per gram of solid.

EXAMPLE IX

Synthesis of 20-Mer Oligonucleotide With Magnetic DMTr-deoxythymidine CPG (Magnetic DMTr-dT CPG)

10 mg of the magnetic dT-CPG from Example VIII was packed in a DNA reaction column. The column was placed in the DNA synthesizer of model 381A manufactured by Applied Biosystems, Inc. (ABI). β-cyanoethyl phosphoramidites and other synthetic reagents for synthesis were acquired from ABI. A 20 mer oligonucleotide of the following sequence was synthesized, i.e., AGA/CAG/TCT/GAT/CTC/GAT/CT. The DMTr groups, which were removed in each synthesis cycle, were collected and measured at 504 nm to check for coupling efficiency. The 20 mers were then cleaved off from the solid phase and subjected to HPLC analysis. The results were found to be the same as those generated from regular non-magnetic glass particles.

EXAMPLE X

Synthesis of Non-Cleavable 25-Mer Oligonucleotide With Magnetic Controlled Pore Glass (Magnetic Oligonucleotide CPG)

1 gram of magnetic epoxy CPG from Example V was hydrolized in 10 ml of acidic aqueous solution at pH=4.0 (adjusted with hydrochloric acid) and at 40° C. for two hours. At the end of reaction, the magnetic CPG was washed five time with 50 ml deionized water, because the epoxy group was converted into dihydroxyl group. This material was designed as magnetic glyceryl glass (magnetic glyceryl-CPG). 10 mg of this material was then packed in a DNA synthesis column. The column was placed in the automatic DNA synthesizer of model 381A manufactured by Applied Biosystems Inc. Beta-cyanoethyl phosphoramidites and other reagents for synthesis were acquired from the same company. A 25-mer of deoxythymidine oligonucleotide of the following sequence was synthesized, i.e., TTT/TTT/TTT/TTT/TTT/TTT/TTT/TTT/T. The magnetic glass powder bearing the 25-mer was then subjected to the treatment of ammonium hydroxide to remove the phosphate protective groups. Due to the more stable phosphodiester linkage between the 25-mer oligonucleotide chain and the glass, a large fraction of the oligonucleotides remained covalently linked to the magnetic glass as confirmed by the DMTr groups and by the capability of the product to hybridize poly$(dA)_{12}$ oligonucleotides. Products bearing the 25-mer are useful to purify mRNA and poly(dA) immediately after synthesis. It is also useful in DNA assays. The magnetic glass with non-cleavable synthetic oligonucleotides is also useful in DNA assay.

EXAMPLE XI

Preparation of Protein A Coated Magnetic Controlled Pore Glass (Magnetic Protein A CPG) Useful as an Antibody Adsorbent One gram of the product of example V (magnetic epoxy CPG) was placed in a vial containing 5 ml of 0.1 m sodium periodate aqueous solution. The vial was placed on a shaker and shook for 1 hour. At the end of reaction, the glass was washed with 5×5 ml deionized water. 15 mg of Protein A was dissolved in 5 ml of 0.01M phosphate buffer of pH=7.2 and added to the glass. The vial was shaken gently in the refrigerator for 24 hours. At the end of coupling reaction, 0.02% (wt %) of sodium borohydride was added to the mixture and the reaction was allowed to proceed for another two hours. pH was adjusted to around pH=8.5 to 9.0 with dilute hydrochloric acid or sodium hydroxide if necessary. At the end of the reaction, the glass was washed 5×10 ml of phosphate buffer. The product was magnetic glass coated with Protein A.

200 mg of the Protein A magnetic glass was placed in a 8 ml vial which contained 5 ml of 10 mg goat anti-BSA (bovine serum albumin) antibody in 0.05M phosphate buffer+0.15M sodium chloride of pH=7.5. The vial was then shook gently in the shaker for one half hour at room temperature. The glass was then washed with 5×5 ml of the loading buffer to remove the excess or unbound proteins. To elute the absorbed antibody from the Protein A magnetic glass, 3×1 ml of 0.1M glycine/HCl buffer of pH=2.0 was used. The washing buffers were pooled together and the protein concentration was measured by Lowry's method at 280 nm. The Protein A magnetic glass was thus found to have a binding capacity of 8 mg goat anti-BSA (bovine serum albumin) antibody per gram of magnetic Protein A CPG.

I claim:

1. In a process for synthesizing a peptide in which an amino acid residue coupled to a solid support is coupled with additional amino acid residues, the improvement which comprises utilizing as said solid support magnetic controlled pore glass having an amino acid residue covalently attached thereto, said magnetic controlled pore glass having a particle size of from about 1 to about 200 microns, and pores having a diameter of from about 60 to about 6,000 Angstroms and a pore volume of from about 0.5 to about 2.5 cc/gm, said pores containing magnetic iron oxide particles absorbed within said pores.

2. The claim 1 process in which said magnetic iron oxide particles are superparamagnetic and are 50–250 angstroms in size.

* * * * *